US012577050B2

(12) United States Patent
Hinojosa et al.

(10) Patent No.: US 12,577,050 B2
(45) Date of Patent: Mar. 17, 2026

(54) OMNICHANNEL SORTATION SYSTEM

(71) Applicant: Dematic Corp., Grand Rapids, MI (US)

(72) Inventors: Arturo Hinojosa, Austin, TX (US);
Ozge C. Ersoy, Austin, TX (US)

(73) Assignee: Dematic Corp., Grand Rapids, MI (US)

( * ) Notice: Subject to any disclaimer, the term of this
patent is extended or adjusted under 35
U.S.C. 154(b) by 512 days.

(21) Appl. No.: 18/173,266

(22) Filed: Feb. 23, 2023

(65) Prior Publication Data

US 2023/0264899 A1 Aug. 24, 2023

Related U.S. Application Data

(60) Provisional application No. 63/312,945, filed on Feb.
23, 2022.

(51) Int. Cl.
B65G 1/137 (2006.01)
(52) U.S. Cl.
CPC ................................. B65G 1/1376 (2013.01)
(58) Field of Classification Search
CPC ... B65G 1/1376; B65G 1/1378; G06Q 10/087
See application file for complete search history.

(56) References Cited

U.S. PATENT DOCUMENTS

| | | | | |
|---|---|---|---|---|
| 9,751,693 | B1 * | 9/2017 | Battles | .................... B25J 9/0084 |
| 10,226,794 | B2 | 3/2019 | Vegh et al. | |
| 10,882,696 | B2 * | 1/2021 | Wan | ........................ G05B 15/02 |

(Continued)

FOREIGN PATENT DOCUMENTS

| | | | | |
|---|---|---|---|---|
| BR | 112021010612 A2 * | 8/2021 | .......... | G06Q 10/087 |
| DE | 112017004045 T5 | 5/2019 | | |

(Continued)

OTHER PUBLICATIONS

International Search Report and Written Opinion from corresponding Patent Cooperation Treaty (PCT) Application No. PCT/IB2023/051679, completed Jun. 10, 2023.

(Continued)

*Primary Examiner* — Jacob S. Scott
*Assistant Examiner* — Erin Morris
(74) *Attorney, Agent, or Firm* — Gardner, Linn, Burkhart
& Ondersma LLP

(57) ABSTRACT

An omnichannel order fulfilment and sortation system and method for operating same are provided for optimizing order fulfilment processes within an order fulfilment facility. The system includes multiple automated storage and retrieval systems or units, including aisle-based systems, grid-based systems, and full case handling systems. A continuous loop sorter is positioned centrally relative to the storage units to receive a multitude of items for many different work in progress orders. Order consolidators are provided adjacent the sorter to receive items for individual orders from the sorter. The quantity consolidators is significantly higher than the quantity of storage units and inducts of the storage units, providing for many orders consolidation locations such that the storage units need not necessarily wait for consolidation locations to become available before retrieving items for other orders. The consolidator selected to receive a particular order is optimized to reduce the strain on resources within the system.

18 Claims, 11 Drawing Sheets

(56) References Cited

U.S. PATENT DOCUMENTS

| | | | |
|---|---|---|---|
| 2004/0016623 A1* | 1/2004 | Olson | B07C 3/008 |
| | | | 198/465.1 |
| 2016/0031644 A1* | 2/2016 | Schubilske | G05B 15/02 |
| | | | 700/216 |
| 2016/0130085 A1* | 5/2016 | Yamashita | B65G 1/1378 |
| | | | 414/807 |
| 2021/0182772 A1* | 6/2021 | Jeswani | G06Q 10/087 |
| 2022/0106121 A1* | 4/2022 | Puite | B65G 1/1375 |

FOREIGN PATENT DOCUMENTS

| | | | | |
|---|---|---|---|---|
| EP | 3166876 B1 * | 11/2018 | | G06Q 10/087 |
| WO | 2019202572 A2 | 10/2019 | | |

OTHER PUBLICATIONS

Zhang et al. "Towards product customization: An integrated order fulfillment system." Computers in Industry 61.3 (2010): 213-222. Retrieved on Jun. 9, 2023 (Jun. 9, 2023) from <https://www.sciencedirect.com/science/article/abs/pii/S0166361509001614>.
Search Report from corresponding European patent application No. 23759421.3, dated Jan. 23, 2026.

* cited by examiner

OMNICHANNEL SORTATION SYSTEM

CROSS REFERENCE TO RELATED APPLICATION

The present application claims priority of U.S. provisional application Ser. No. 63/312,945 filed Feb. 23, 2022, which is hereby incorporated herein by reference in its entirety

FIELD OF THE INVENTION

The present invention is directed to order fulfilment methods and systems, and in particular to sortation and order consolidation operations in order fulfillment operations.

BACKGROUND OF THE INVENTION

Order fulfillment must take place within a relatively short period of time in order to be commercially competitive and resource efficient. Inefficiencies and conflicts arise in warehouses due to the size constraints associated with warehousing and transporting items for order fulfilment, such as the amount of equipment or personnel required to carry out an order fulfilment process, continuous inventory depletion and replenishment, and other factors. Additional inefficiencies and conflicts arise in sequencing orders and compiling or consolidating items for orders having multiple items. Inbound inventory is typically decanted in an upstream decanting function and the decanted items are stored as inventory in a downstream storage system or storage area. When an order is placed, the item or items required for that order that are in the storage system are released to a picking station where an operator transfers the item to an order carton. If an item required for the order is not present in the storage inventory, the order must wait or be delayed until more of that required item is decanted and placed into the inventory storage system. If a downstream process, such as an order consolidation workstation (e.g. a pick station) or a packing station are busy or processing order slowly, the upstream process, including inventory retrieval from automated storage and retrieval systems and sorting of the retrieved inventory may need to halt until the downstream processes become available. Any halts at upstream processes result in throughput reductions and facility inefficiencies.

Order fulfillment processing may utilize wave-based order sequencing in which multiple orders are grouped or sequenced into a large group or "wave". Typically, multiple waves are created to accommodate large order volumes to be handled and processed within a fulfilment facility or warehouse during a given period (i.e. a 4-hour period). The quantity of orders within a wave may be chosen based on the hardware capacity of the fulfilment facility, such as the number of item handling apparatuses and/or workstations in the facility that are available for the order fulfilment processes being performed. Wave-based order sequencing has inherent inefficiencies that may result in downtime of both upstream and downstream processes.

SUMMARY OF THE INVENTION

The present invention provides an omnichannel sortation system and method for controlling the sortation system. The sortation system is provided for order fulfilment and warehouse facilities and includes an order management system (i.e. OMS), an automated storage and retrieval system with multiple storage units, and a continuous loop sorter. According to one form of the present invention, the sortation system includes an induct or picking workstation between each of the storage units and the sorter. An operator (human or robot) at each induct picks order items for work-in-progress (WIP) orders from donor receptacles (e.g. totes) or full vendor cases and transfers or inducts the WIP order items to the sorter. An array of order consolidators, such as in the form of chutes and/or holding platforms, are provided alongside the sorter and each consolidator provided to receive the items for a particular WIP order. The system and method may enable a warehouse facility to expand the volume of storage units and quantity of inducts in the system while having sufficient capacity at the sorter to handle the increase in inducted order items from the additional storage volume.

In some instances, the system and method have shown to support throughput capacities of about fifty thousand units per hour within a single facility. The system and method also enable the OMS to expedite urgent orders by resequencing or reordering the WIP order sequence without the requirement that prior WIP orders be completed before handling the urgent order or waiting on a downstream consolidator to clear before releasing the item(s) for the urgent order from the storage unit to the sorter via the corresponding induct. In other words, the method and system interleave multiple order fulfilment processes at the various component systems (e.g. ASRS, inducts, sorter, consolidators, etc.) which prevents or substantially eliminates choking of upstream processes (e.g. donor tote retrieval and picking) and starvation of downstream processes (e.g. order consolidation). The system and method are particularly advantageous for opportunistic picking of items for more than one WIP order or a future order from a donor tote and/or opportunistic picking of item for more than one WIP order from a full vendor case. Full vendor cases may be picked for WIP orders with any residual items inducted and transported by the sorter, diverted from the sorter to an induct of an aisle-based storage unit, and then stored in the aisle-based storage unit until required for future orders.

According to one aspect, the sortation system includes a substantially higher quantity of consolidators as compared to the quantity of inducts, preferably providing enough order consolidation locations such that the storage units and/or inducts will not be choked (i.e. required to wait to induct additional items until an order consolidation location becomes available). For example, the system may include ten consolidator chutes per induct. Optionally, the consolidators may be configured to receive order items directly into an order container such that all required items for a WIP order are present in the order container the order is substantially ready to ship or transport to the customer. The OMS may be provided in the form of a warehouse management system (WMS), warehouse control system (WCS), warehouse execution system (WES), or a combination of WMS, WCS, and/or WES. Optionally, the consolidators may be configured to receive specific types of orders. For example, some of the consolidators may be configured to receive WIP order items in a shipping bag, while others of the consolidators may be configured to receive WIP order items in a shipping carton, etc.

According to another form of the present invention, the method for controlling the omnichannel sortation system includes selecting an order to activate to a WIP order as chosen from a pending order list. The OMS determines the availability and location of items required for the selected WIP, such as whether all required items are available in aisle-based storage units or whether additional inventory is required to meet the WIP order item requirements. For example, if the selected WIP order includes a first item in one aisle-based storage unit and a second item in another aisle-based storage unit, the method includes releasing/ retrieving the first item from its storage unit with a shuttle and transporting the first item to the corresponding induct, such as with a lift system. The second item is released/ retrieved from its storage unit with a shuttle and transported to the corresponding induct. Each of the first and second items are picked from donor totes at their corresponding induct and transferred or inducted to the sorter.

In one aspect, the OMS assigns a best available consolidator to receive the order items for the particular WIP order. The selection of the best available consolidator may be performed as a function of (i) the consolidator requiring the shortest possible combined travel distance along the sorter for the first and second items, and/or (ii) the consolidator that is immediately downstream of the induct that will release its order either first compared to the other WIP order items or last compared to the other WIP order items. Once the best available consolidator is selected, the OMS directs the sorter to divert the first and second items respectively, in a most efficient manner. Preferably, each item traverses less than the entirety of the continuous loop sorter prior to being diverted into the selected consolidator. Once all items required for the WIP order are present in the consolidator, the OMS orders the WIP orders items to be discharged to a downstream process, such as a packing workstation via a conveyor provided between the consolidator and packing station and/or a transportation or delivery subsystem for dispatching the completed order to the customer.

Accordingly, the omnichannel sortation system and method for controlling the sortation system provide high volume throughputs within an order fulfilment facility. Urgent or high priority orders may be prioritized above already in progress orders without diverting or re-directing items for in progress orders while permitting the urgent order to be completed prior to the already in progress orders. An additional benefit of the system and method include opportunistic picking of donor totes and inbound full vendor cases, which further improves throughput capacity by eliminating inefficient or duplicitous transfers of items that are already needed for a WIP order or which will be needed for a pending order within a user defined period. The continuous loop sorter and relatively high quantity of order consolidators preferably enable the storage units and inducts to continuously release order items to the sorter without choking them due to downstream bottlenecks or delays.

These and other objects, advantages, purposes and features of this invention will become apparent upon review of the following specification in conjunction with the drawings.

DESCRIPTION OF THE PREFERRED EMBODIMENTS

Figure 1:
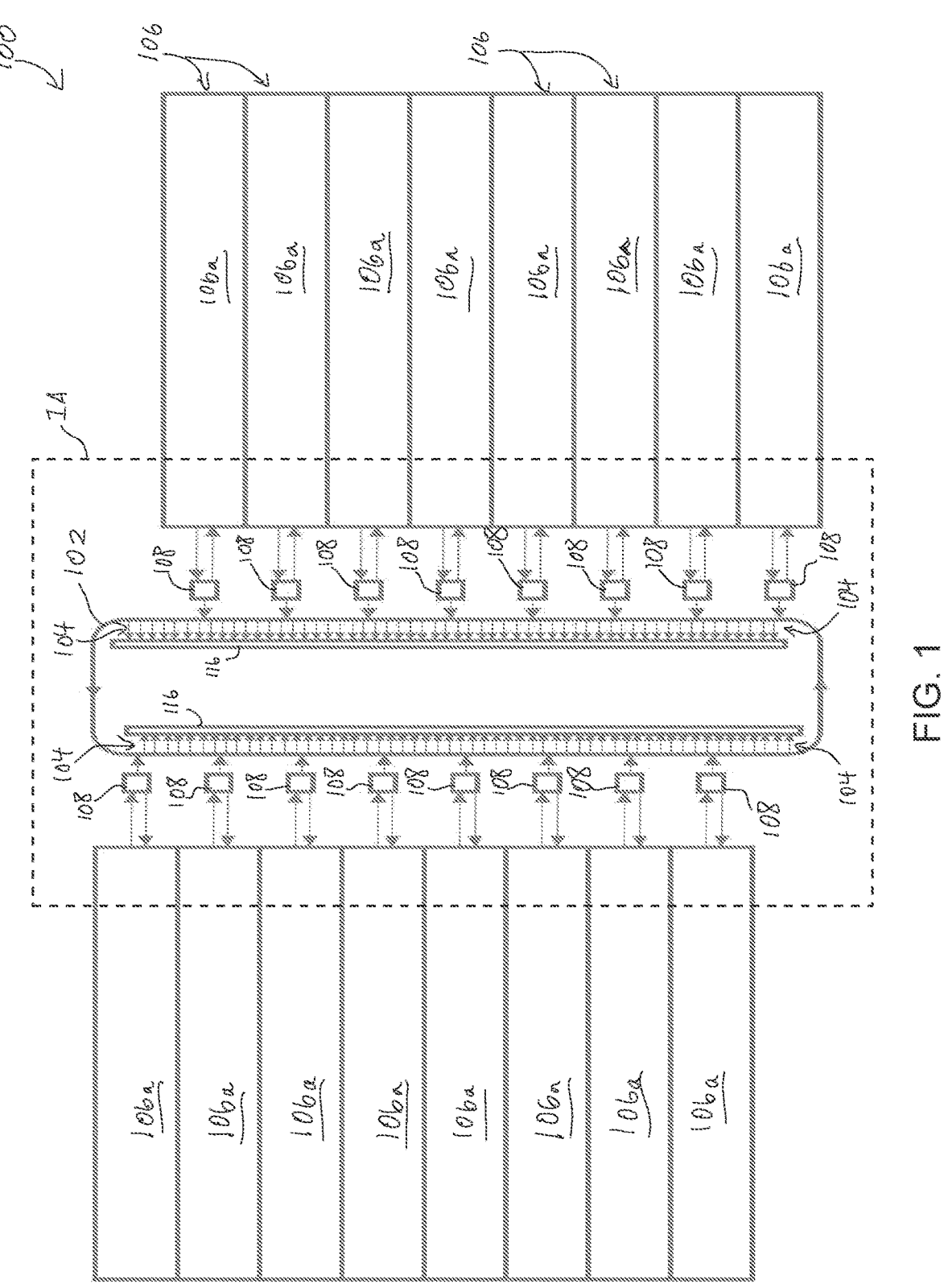
FIG. 1 is a schematic diagram of an exemplary omnichannel sortation system for an order fulfilment facility, in accordance with the present invention.
Figure 1A:
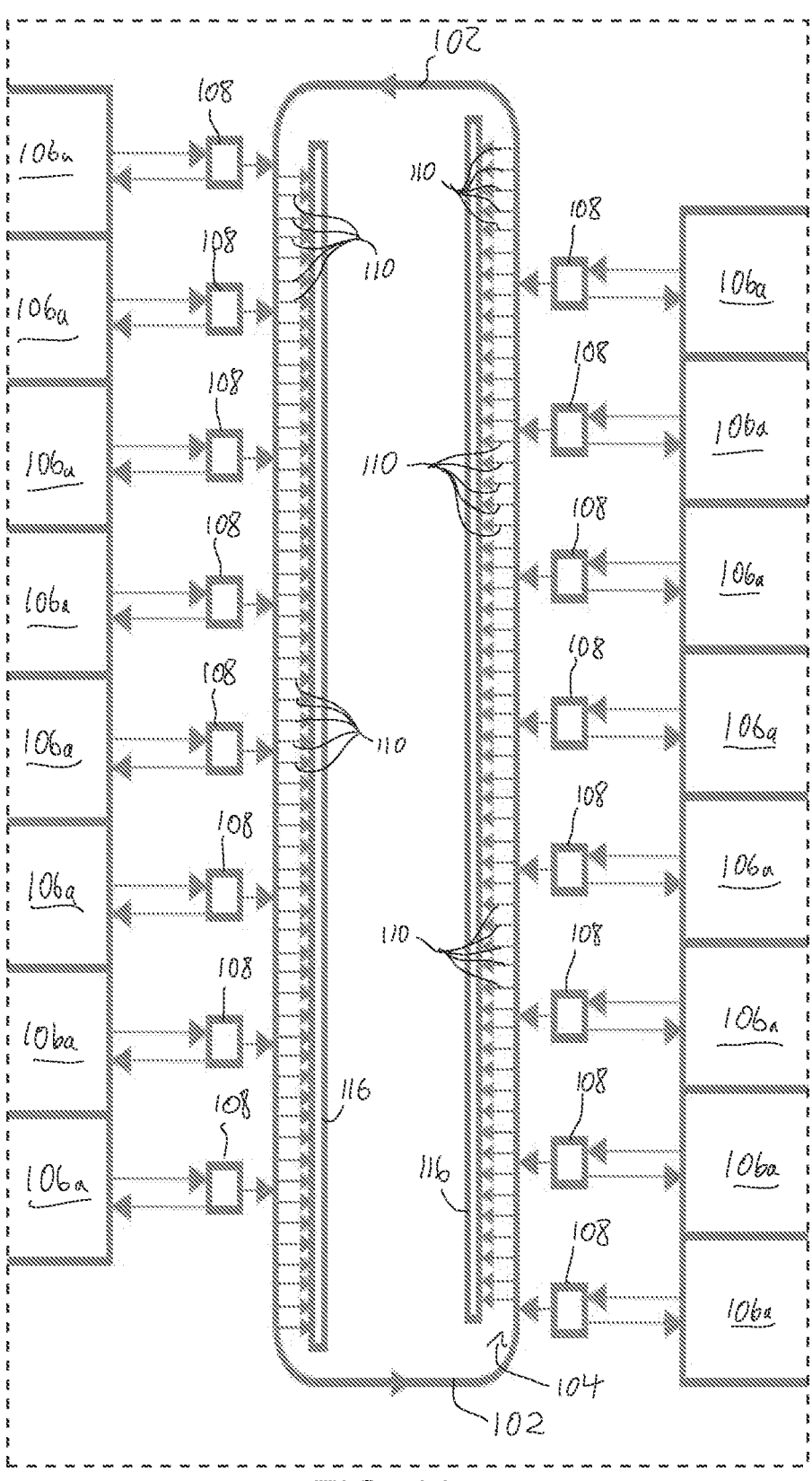
FIG. 1A is an enlarged view of the region designated 1A in FIG. 1.

Referring now to the drawings and the illustrative embodiments depicted therein, an omnichannel sortation order fulfilment system 100 and method 200 for controlling the system 100 are provided for order fulfilment within an order fulfilment facility (FIGS. 1, 3, and 4-12). The system 100 and method 200 utilize a sortation system, such as in the form of a continuous loop sorter 102, and multiple order consolidators or consolidation locations or platforms 104, such as in the form of chutes 110, positioned alongside the sorter 102 and provided for receiving items required to fill a work in progress (WIP) order (FIGS. 1 and 1A). The system 100 is particularly well suited for order fulfilment facilities having multiple storage units 106 in the form of automated storage and retrieval systems, such as aisle-based storage systems 106a with storage and retrieval shuttles, for example. An induction system or workstation, i.e. an induct 108, is located between each storage unit 106 and the sorter 102 to transfer inventory items from the respective storage unit to the sorter 102. Optionally, each induct 108 may be operable to transfer items from the sorter 102 into the respective storage unit, such as for storage inbound inventory items for future order processing. Several of the consolidators 104 are provided between adjacent inducts 108 and storage units 106. The sorter 102 and consolidator 104 configuration enables high volume throughput by providing a multiple of order consolidation locations in a relatively small footprint of the facility. Advantageously, the system 100 and method 200 do not require that inventory in the storage units 106 be optimized or have been stored with so-called "smart put away", they do not require intelligent inventory slotting, nor do they require a precise multiplicity of inventory item stock keeping units (SKUs) to perform the order fulfilment processes within the facility.

Figure 3:
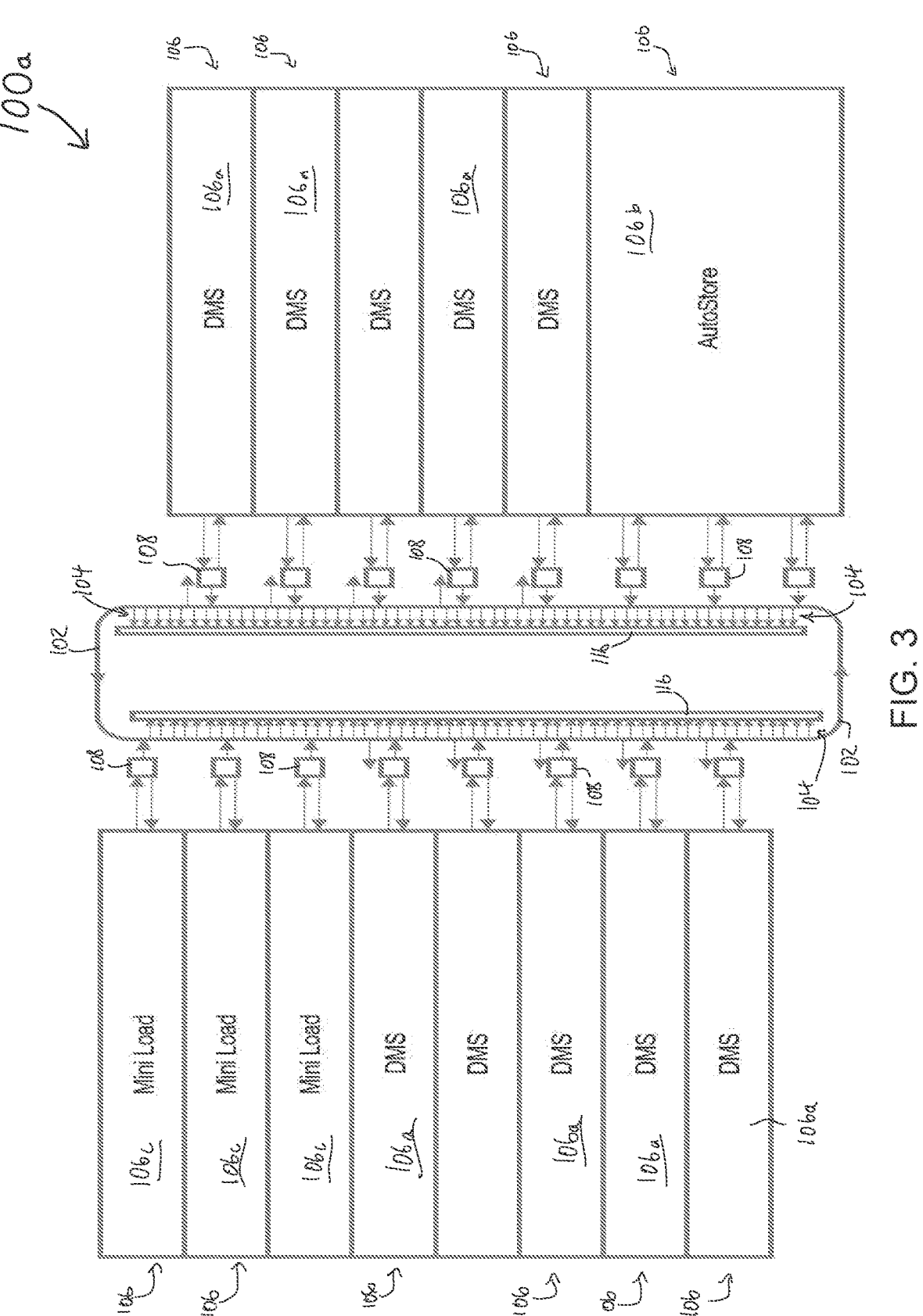
FIG. 3 is a schematic diagram of another exemplary omnichannel sortation system for an order fulfilment facility, in accordance with the present invention.

Referring now to the illustrative embodiment of FIGS. 1 and 1A, the system 100 includes an order management system (OMS) having a computer for controlling order fulfilment processes within the system 100. The OMS may be provided in the form of a warehouse management system (WMS), warehouse control system (WCS), warehouse execution system (WES), or a combination of WMS, WCS, and/or WES. The storage units 106 are provided in the form of aisle-based storage systems 106a including storage racks with multiple rack levels defining storage locations for inventory receptacles or totes. Shuttles operate on each rack level to store and retrieve totes at the storage locations and a lift to transport totes from the rack levels. The aisle-based storage system may be similar or substantially identical to multi shuttle storage systems marketed and sold under the trademark MULTISHUTTLE® from Dematic Corp. of Grand Rapids, MI The storage systems 106a are positioned alongside the sorter 102 with an induct 108 provided between the lift of each storage system 106a and the sorter 102. Conveyance systems are provided between the lifts, the inducts, and the sorter 102. The inducts 108 may be automatically or manually operable to retrieve inventory items from donor receptacles and transfer (i.e. to induct) the items to the sorter 102. For example, the inducts 108 may each include an automated robotic picker that is controlled by the order management system. Alternatively, the inducts 108 may have human operators performing pick and transfer operations to induct items to the sorter 102. While the storage units 106 of the illustrative embodiment are described as aisle-based storage systems 106a, it will be appreciated that the storage units may be defined as other forms of automated storage and retrieval systems, such as grid-based storage systems, pouch storage systems, and/or mini load storage systems. For example, as illustrated in FIG. 3, another exemplary omnichannel sortation order fulfilment system 100a is depicted, which is similar in structure and function to system 100 in many respects, and includes multiple aisle-based storage systems 106a, a grid-based storage system 106b, and multiple mini load storage systems 106c, with one or more inducts 108 provided to service each storage unit 106.

As best illustrated in FIG. 1A, the system 100 includes a multitude of order consolidators 104. Each arrow on the interior of the sorter 102 loop depicted in FIG. 1A represents a single consolidator 104. The consolidators 104 are positioned alongside and in transport communication with the sorter 102 such that the sorter 102 may divert items from the sorter's transport surface directly into each of the consolidators 104. The sorter 102 may be configured as a cross-belt sorter, a tilt tray sorter, a Bombay sorter, a pouch sorter, an AMR-based unit sorter, or any other type of unit sorter. The consolidators 104 may be uniformly spaced relative to one another. Preferably, each consolidator receives one or more items from the sorter 102 corresponding to a single WIP order (e.g. individual customer order, batch order, or a plurality of individual orders to be directed to a single location). Each grouping of items diverted to and held at a consolidator 104 represents a consolidated order 105.

Figure 2:
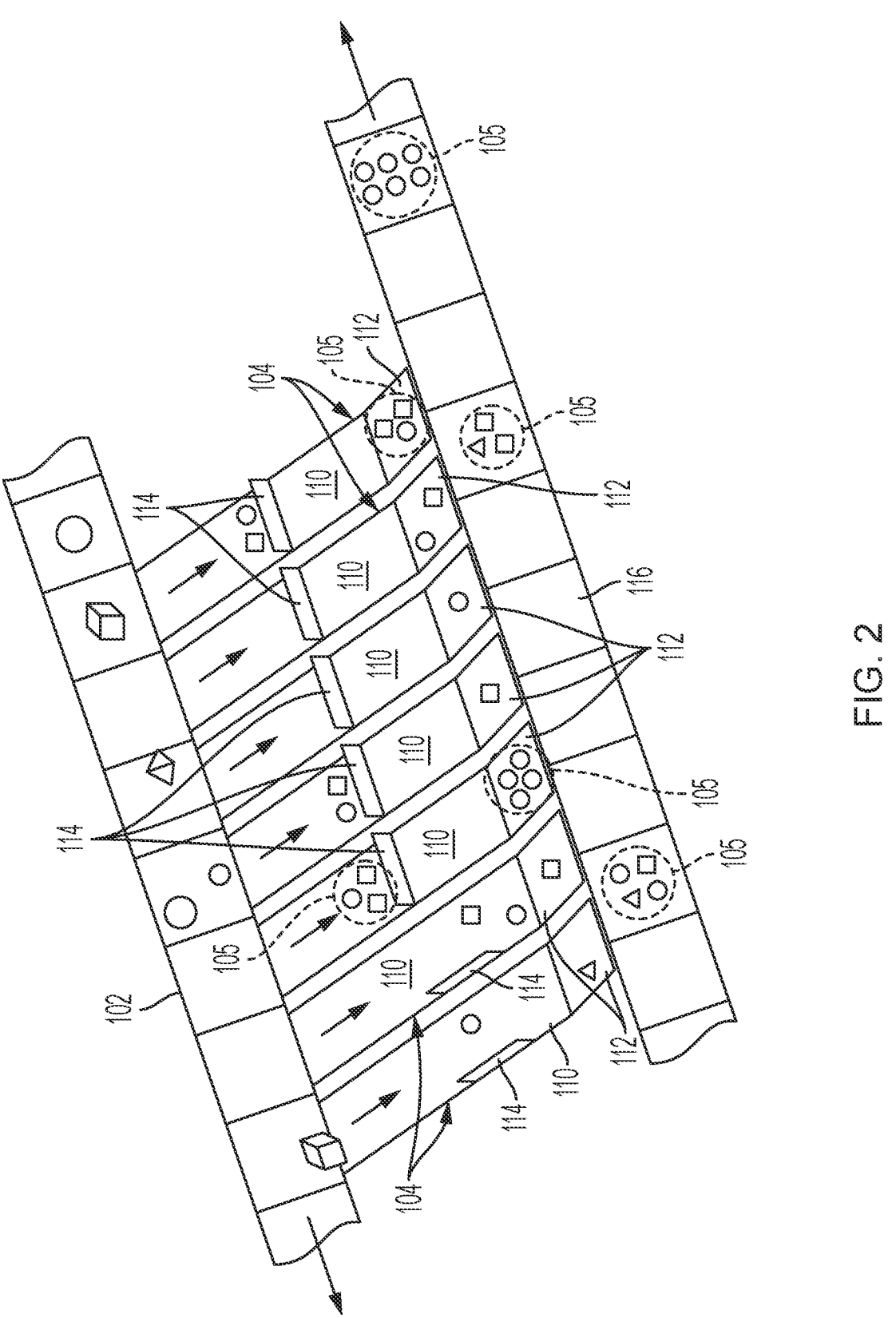
FIG. 2 is a perspective view of an order consolidator in transport communication with a sorter of the omnichannel sortation system of FIG. 1, in accordance with the present invention.

In a preferred embodiment, the consolidators 104 each include a chute 110 permitting gravity to urge or move the diverted items down the chute 110 into a holding position or platform 112 of the consolidator 104. Optionally, a temporary holding device or apparatus, such as a rotatable gate 114, may be provided at a middle portion of each chute 110 such that items in a consolidated order may be held at a middle portion of the chute 110 prior to being released to the holding platform 112 (FIG. 2). In other words, the region above the gate 114 (nearest the sorter 102 surface) represent an upper area or chamber to hold items for one WIP order, while the holding platform 112 below the gate 114 represent a lower are or chamber to hold items for another WIP order. In this manner, each consolidator 104 may be utilized to hold one WIP order that is being consolidated above the gate 114, while another WIP order that has been fully consolidated is held at the holding platform 112. As such, the system 100 need not wait until a consolidated order has been released from the consolidator 104 prior to the consolidator 104 being available to begin receiving another WIP order. In this manner, the consolidators 104 provide an induction zone to receive items and direct them to the holding platform (e.g. shipping carton).

Once a consolidated order is ready at the holding platform 112, the OMS may release the consolidated order when a downstream process is ready to receive the order. For example, once a packing station is available to receive the consolidated order, the OMS releases or transfers the consolidated order from the holding platform 112 to a conveyor 116 to be transported to the available packing station. In an alternative embodiment, the holding platform 112 may be configured to support an order container (e.g. shipping carton) to receive order items from the chute 110, such once the entire order is consolidated in the order container, it may be released directly to a shipping system or carrier for shipment to a customer. It is contemplated that certain ones of the consolidators 104 may be configured to receive certain types of items, while other consolidators 104 may be configured to receive other types of items. For example, some of the consolidators 104 may be configured to receive order items into shipping bags, while others of the consolidators 104 may be configured to receive order items into shipping boxes. It is further contemplated that an operator, i.e. packer, transfer items from the holding platform 112 into a shipping container and complete the packing function and then transfer the packed shipping container onto the conveyor 116 to be transported to a transport vehicle or carrier for delivery to the customer.

The OMS of system 100 is operable to direct the release of required items for a WIP order from corresponding ones of the storage units 106 that contain the required items. The OMS directs the shuttle to transport the item(s) to the lift and directs the lift to transport the item(s) to the corresponding induct 108. The OMS directs the picker or pick system to pick required items at the induct 108 and transfer them to the sorter 102. The sorter transports the items toward a selected consolidator 104 as selected by the OMS and then diverts each item for a particular order to the selected consolidator 104.

The selected consolidator 104 for a particular order may be selected based on various parameters to ensure the best available consolidator 104 is selected for the order. For example, the selected consolidator may be selected by the OMS based on one or more of the following: (i) the consolidator 104 requiring the shortest overall distance travelled along the sorter 102 by all of the items for a particular order, (ii) the consolidator 104 that is immediately downstream of the induct corresponding to the last one of the storage units to release a required item for the particular order. Factors contemplated for selecting the selected consolidator include whether a consolidator is unassigned (i.e. there is no WIP order at the consolidator or there is no WIP order at the upper chamber of the consolidator), whether the consolidator is configured to receive the type of goods defining the order (e.g. an order may require a shipping bag, however a particular consolidator may only be configured for shipping boxes), whether the consolidator is sufficiently downstream of an induct that will release an order item such that the released item is able to reach the selected consolidator without traversing the entirety of the sorter 102 prior to being diverted to the selected consolidator.

Referring to the illustrative embodiments of FIGS. 4-12, an order fulfilment method 200 is provided controlling an omnichannel sortation system, such as systems 100 and 100a described above and illustrated in FIGS. 1-3. For illustrative purposes, method 200 will be described in relation to the omnichannel sortation system 100a, as illustrated in FIG. 3, however, it will be appreciated that the method 200 may be implemented and/or adapted for use in various order fulfilment facilities having different hardware configurations. Also for illustrative purposes, method 200 is described in terms of several functions or sub-methods 200a-200i for controlling different aspects of the system 100a in order to fulfill orders. While the sequence of the illustrative sub-methods 200a-200i is particularly well-suited for the exemplary embodiment, it will be appreciated that each sub-method may be re-arranged, used independently, or omitted in different contemplated embodiments, without significantly affecting the benefits and function of the invention.

Figure 4:
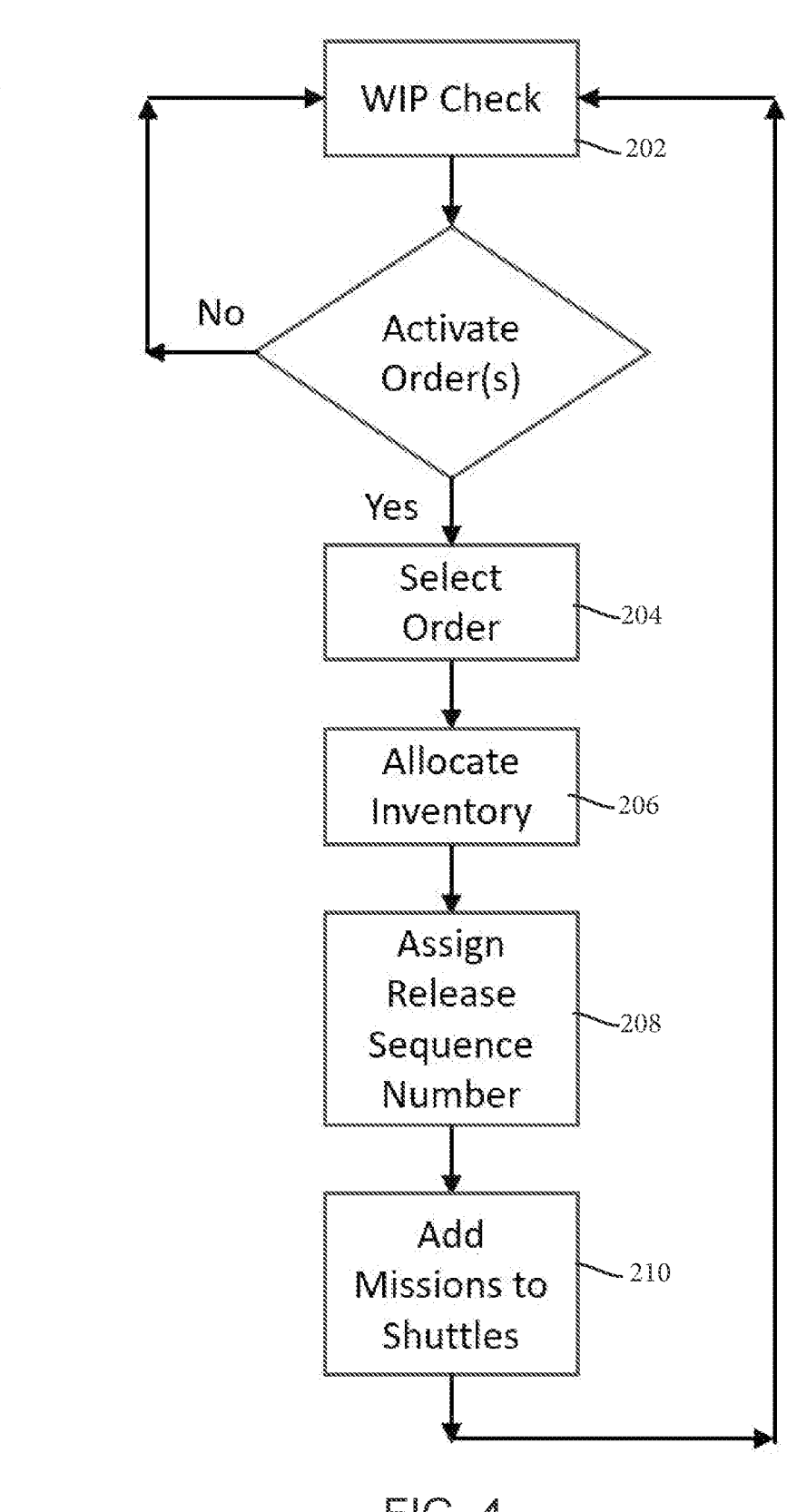
FIG. 4 is a diagram of a method for initiating an order fulfilment operation in an omnichannel sortation system, in accordance with the present invention.

Referring to the illustrative embodiment of FIG. 4, sub-method 200a is provided for activating orders from a pending order list to a WIP order. The OMS performs 202 a check or status review of the system 100a to determine whether another order from the pending order list should be activated to a WIP order (FIG. 4). If it is determined that no order from the pending order list should be activated, the OMS returns to 202 until an order is determined to be ready to activate. The determination whether to activate an order or not may be made as a function of whether there is sufficient inventory in the storage units 106 to fulfil a particular order in the pending order list or whether there are sufficiently available resources in the system 100a to handle and fulfil the particular order, for example.

Figure 5:
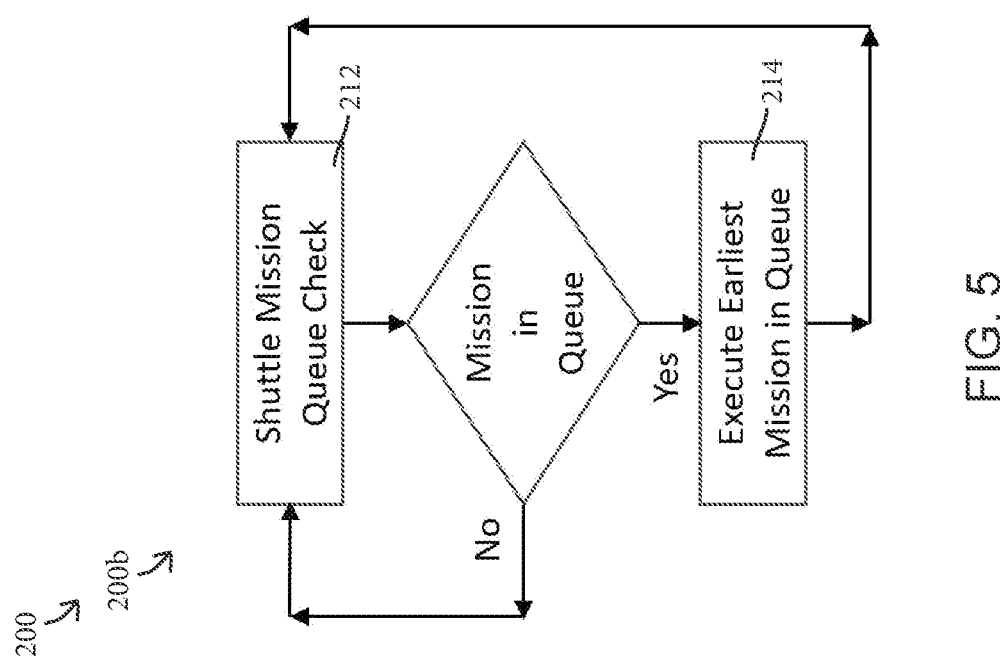
FIG. 5 is a diagram of a method for controlling an inventory receptacle retrieval operation in an omnichannel sortation system, in accordance with the present invention.

When an order is ready to activate to a WIP order, that order is selected 204 by the OMS from the pending order list and inventory within the storage units 106 is allocated 206 for the WIP order (FIGS. 3 and 4). The OMS assigns 208 release sequence numbers to each item for the WIP order, such that each item is queued for release from its respective storage unit 106. For example, the release numbers are sequenced after all previously assigned release sequenced numbers for items for other WIP orders. Optionally, the release sequence numbers may be re-ordered or re-sequenced to accommodate an urgent order, such that items in the urgent order may be prioritized over items that had previously been assigned a release sequence number. Retrieval mission instructions are added or directed 210 to operators (e.g. shuttles or autonomous mobile robots) operating in the respective storage units 106 to retrieve the required order items based on their assigned release sequence numbers. Sub-method 200b is provided for the retrieval of donor/inventory totes containing the required items in the respective aisle-based storage units 106a (FIGS. 3 and 5). The OMS monitors or checks 212 the mission queue of each shuttle in the system 100a and determines whether there are any missions for WIP orders in the queue, and if not, the OMS waits until a mission is queued. If a mission is queued, the OMS directs the shuttles to execute 214 the earliest mission in the queue, as determined by the release sequence numbers of items in the particular storage system 106a, in order to release the item from the storage unit. The shuttle retrieves the item of the earliest mission and transports it to the lift of the storage unit 106a.

Figure 6:
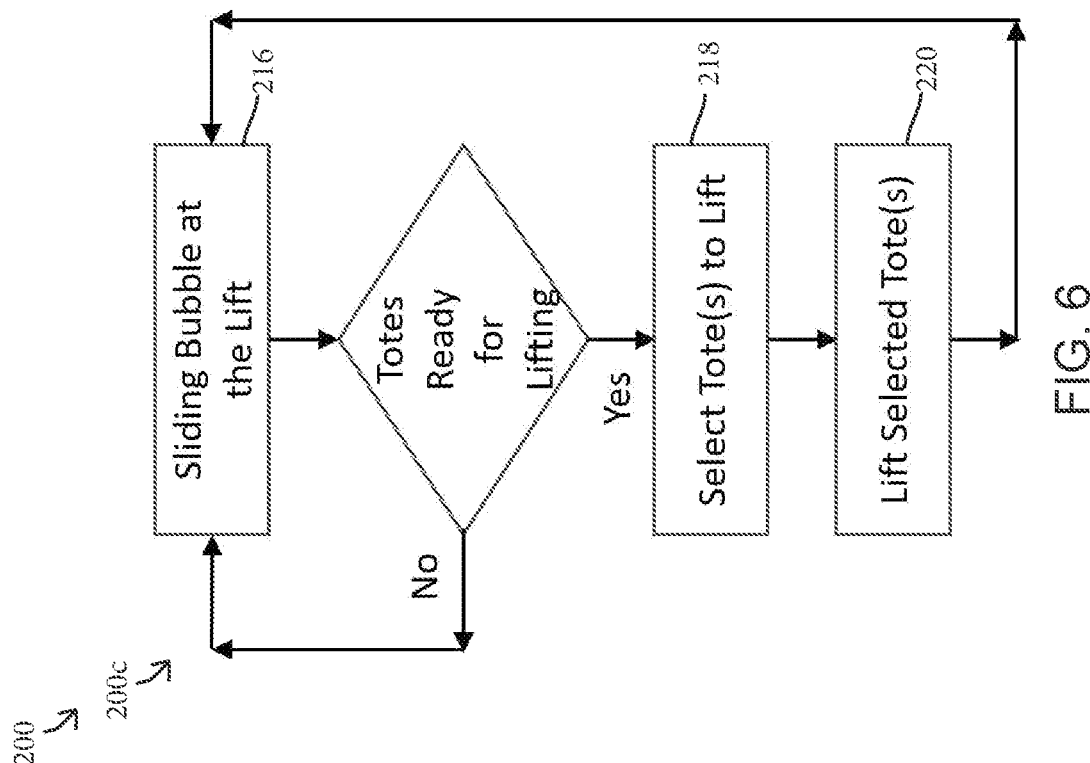
FIG. 6 is a diagram of a method for controlling a lift within an omnichannel sortation system, in accordance with the present invention.

Sub-method 200c is provided for the controlling the lifts of the aisle-based storage units 106a to transport the items from particular rack levels to the respective inducts 108 (FIGS. 3 and 6). The OMS monitors 216 a WIP order list in relation to donor totes that require lifting. If there are no donor totes to be lifted within a particular storage unit 106a, the OMS continues to monitor 216 and waits until a tote is ready. Once one or more donor totes are ready for lifting from a storage unit 106a, the OMS selects 218 a tote to lift and then lifts 220 the tote and transfers it to the induct 108. The selection 218 of which tote to lift (if multiple totes are ready to lift) may be determined based on a sliding bubble order sequencing approach, such as the sliding bubble approach disclosed in commonly owned and assigned U.S. Pat. No. 10,882,696, issued Jan. 5, 2021 by Dematic Corp. of Grand Rapids, MI, the disclosure of which is hereby incorporated herein by reference in its entirety. In this manner, the method 200 may operate the system 100a in an efficient, waveless sequence, thereby providing a high-volume throughput.

Figure 7:
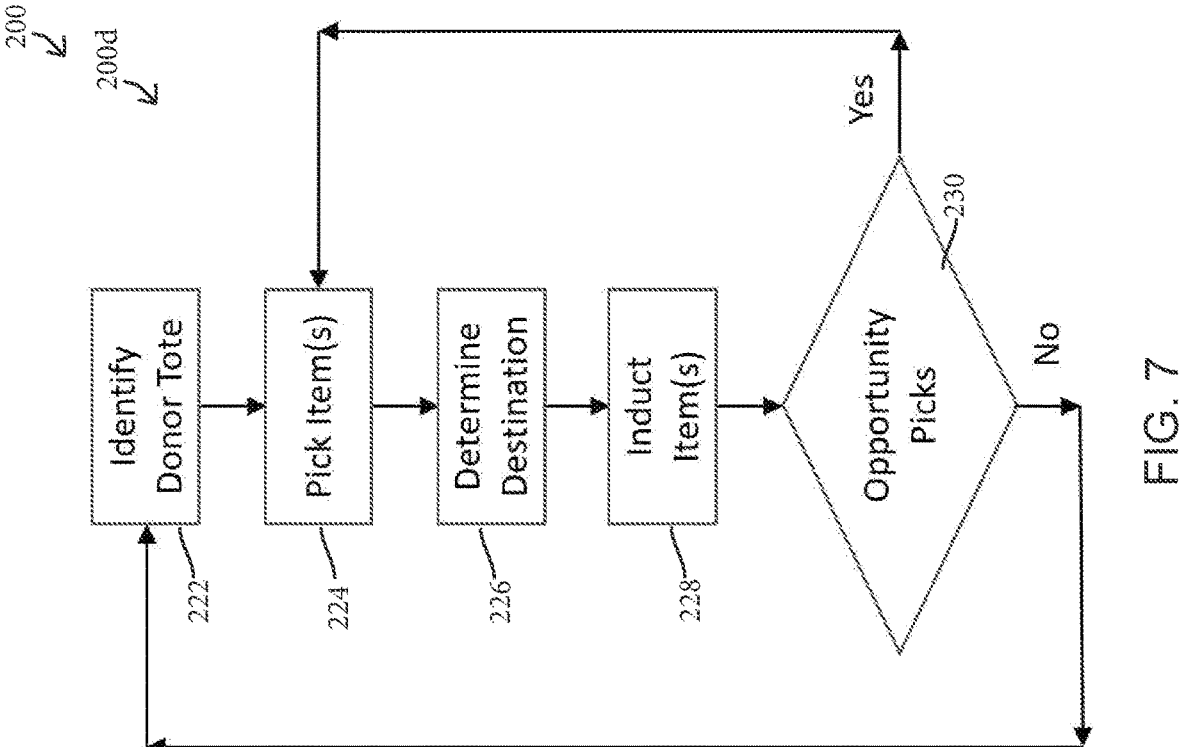
FIG. 7 is a diagram of a method for picking items from inventory receptacles and inducting the picked items to a sorter in an omnichannel sortation system, in accordance with the present invention.

Sub-method 200d is provided for controlling the inducts 108 of the storage units 106, and in particular the inducts at the aisle-based storage systems 106a (FIGS. 3 and 7). The OMS controls an induct 108 to identify 222 a donor tote present in the induct and directs the induct operator (e.g. human or robot) to pick 224 the required items for the WIP order from the donor receptacle. The OMS determines 226 a destination for the picked item, in which the destination for the picked item is a function of the other order items for that WIP order. In other words, the destination determined at 226 is not necessarily a specific location within the facility but is a representative destination that optimizes the movement and transportation of the item in relation to all of the other items within the WIP order. For example, the destination determined at 226 may be a particular tray on the sorter 102, which optimizes or minimizes the distance or time that the item will spend on the sorter 102. Once the destination for the item is determined at 226, the item is inducted or transferred 228 to the sorter 102. Induction to the sorter 102 may include dispensing the item into a tray supported on the sorter surface, for example, wherein the tray is tracked by the OMS and thereby the location of the item on the sorter 102 is known. After the WIP order items have been picked from the donor tote, the sub-method 200d includes determining 230 whether any items remaining in a donor tote at the induct 108 are required for another WIP order that is already activated but having a later sequence number. It is contemplated that due to the sorter 102 and consolidator 104 capacities of the system, the determination at 230 may include whether any items remaining in a donor tote at the induct 108 are required for another order in the pending order list which is not currently activated but is likely to be activated within a user-defined period (e.g. the next half hour, see FIG. 7). In other words, the sorter and consolidator capacities may be underutilized at a given time such that some items for a non-activated, but imminent, pending order may be opportunistically picked and transported on the sorter 102 and/or diverted to a selected consolidator 104 and held until that order is activated, Thus, sub-method 200d may be said to be monitoring at the induct for an opportunistic picking opportunities. The determination at 230 may be performed based on a sliding bubble approach, similar to that described in above-mentioned U.S. Pat. No. 10,882,696.

If it is determined at 230 that residual items in a donor tote may be opportunistically picked, the OMS returns to pick items from the donor tote at 224, determines 226 a destination for the opportunistically picked item, and then inducts them to the sorter 102 at 228. For an example, if the OMS determines that the donor tote at the induct 108 is the object of additional retrieval missions for WIP orders (e.g. one of the other currently activated WIP orders) the OMS directs picking the items from the donor tote while it is already at the induct, such that the donor tote will not have to be stored and then retrieved again to retrieve the items for the other WIP activated orders. If no items are suited for opportunistic picking, the donor tote with residual items is directed back to the storage unit 106a until it is required for a future WIP order.

Figure 8:
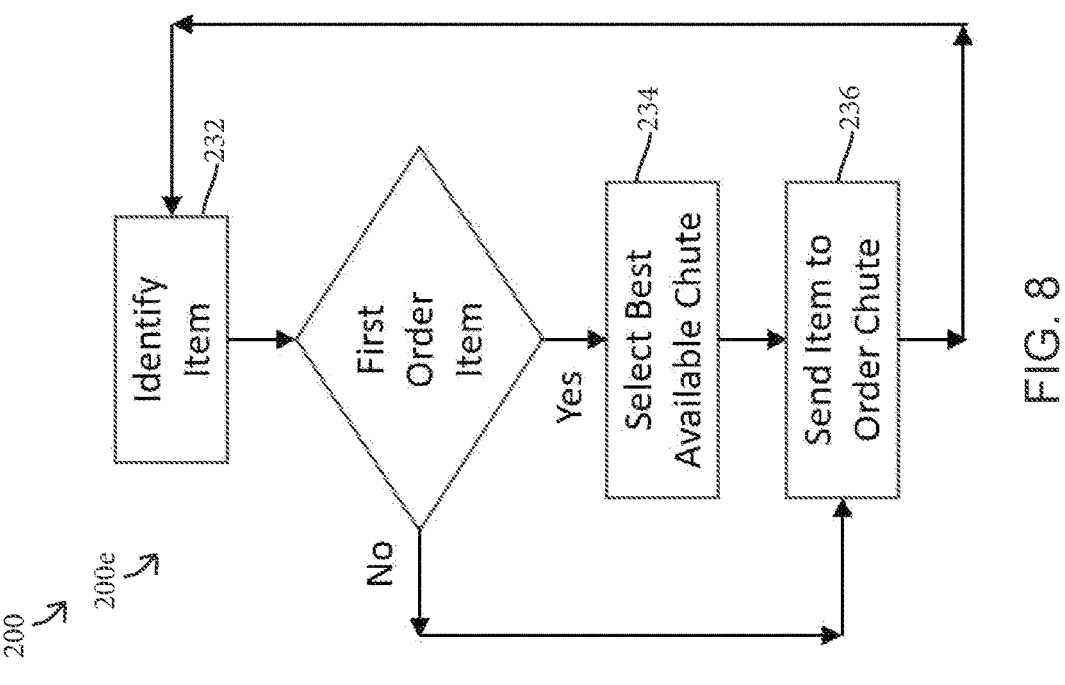
FIG. 8 is a diagram of a method for selecting an order consolidation location to receive order items within an omnichannel sortation system, in accordance with the present invention.

Sub-method 200e is provided for selecting the optimal consolidator 104 to receive the items for a particular WIP order (FIGS. 2, 3, and 8). The OMS identifies 232 the item on the sorter 102, such as by determining the tracked tray in which the item is placed. The OMS compares the item with other items in the WIP order to determine if the particular item is the first item to be handled and/or diverted from the sorter 102. If the item is the first item to be handled and/or diverted, the OMS selects 234 the best available consolidator 104 for the WIP order. The selection 234 of the best consolidator be chosen based on various parameters and may be chosen as function of which consolidator 104 requires the shortest overall distance travelled along the sorter 102 by all of the items for a particular order. Alternatively, instead of selecting 234 the consolidator 104 based on the total combined distance travelled on the sorter by each of the required WIP order items, the selection 234 may be of that consolidator 104, which is either immediately downstream of the induct corresponding to the first of the required items to be handled and/or diverted for the particular WIP, or immediately downstream of the induct corresponding to the last of the required items to be handled and/or diverted for the particular WIP.

Figures 9, 10:
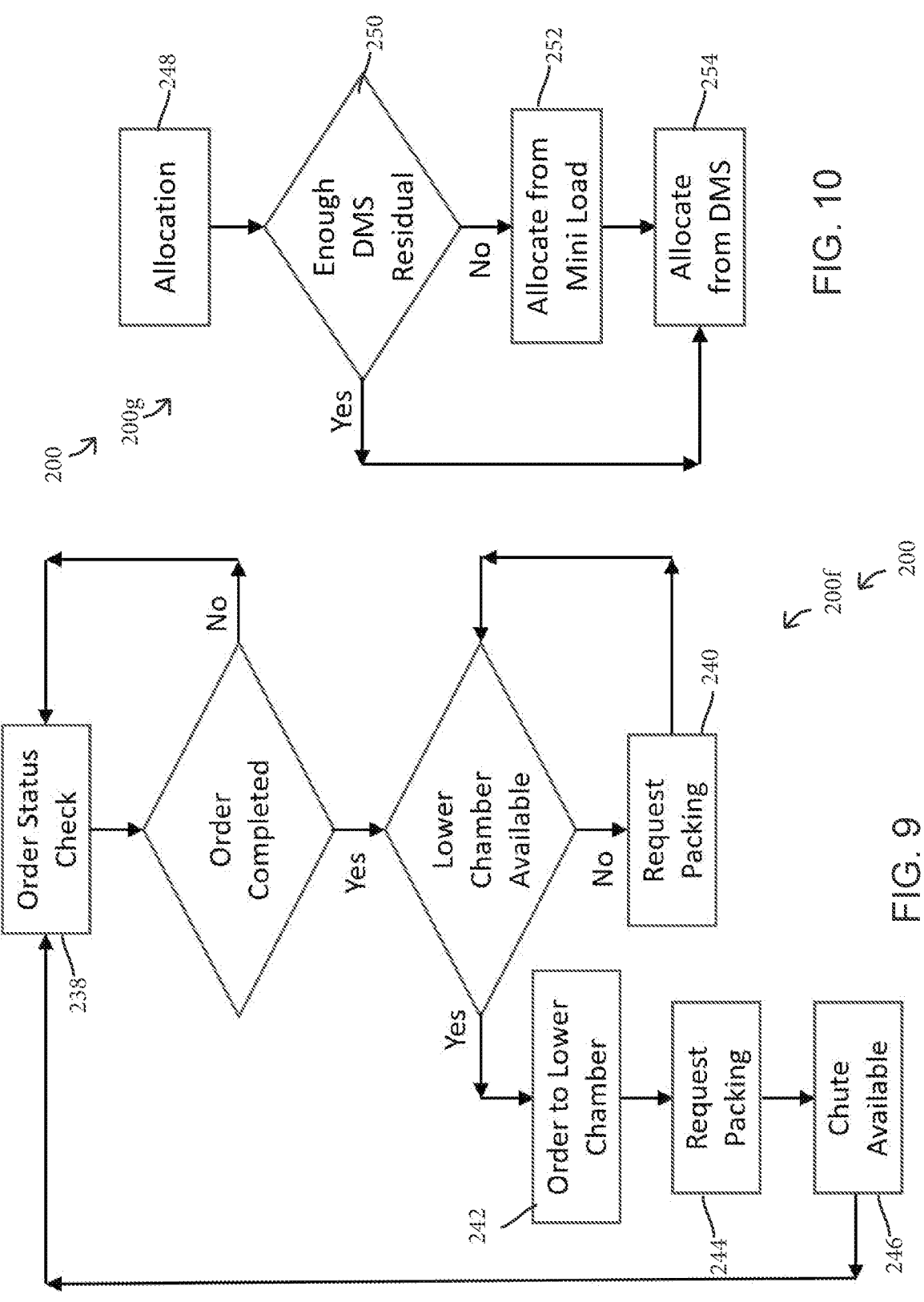
FIG. 9 is a diagram of a method for consolidating order items and transferring completed orders to a packing station in an omnichannel sortation system, in accordance with the present invention.
FIG. 10 is a diagram of a method for selecting a storage unit within an omnichannel sortation system from which to retrieve items for an in-process order, in accordance with the present invention.

Factors contemplated for selecting 234 the selected consolidator include whether a consolidator is unassigned (i.e. there is no WIP order at the consolidator or there is no WIP order at the upper chamber of the consolidator), whether the consolidator is configured to receive the type of goods defining the order (e.g. an order may require a shipping bag, however a particular consolidator may only be configured for shipping boxes), whether the consolidator is sufficiently downstream of an induct that will release an order item such that the released item is able to reach the selected consolidator without traversing the entirety of the sorter 102 prior to being diverted to the selected consolidator, in addition to other contemplated factors or parameters. Once the best available consolidator is selected at 234, the OMS controls the sorter 102 to send or divert 236 items for a particular WIP order to its selected consolidator 104. If it is determined that a consolidator has already been selected at 234 after a particular item is identified at 232, the OMS controls the sorter 102 to send or divert 236 that item to the selected consolidator 104 for that WIP order. Because the OMS determines a shortest required travel distance along the sorter 102 for order items, an item in a particular tray is typically diverted after a short travel distance along the sorter, this cumulatively results in sorter trays becoming available again for receiving other items for WIP orders from inducts 108. As such, it is an advantage of the systems 100 and 100a and method 200 that a tray on the sorter may be utilized multiple times to receive, transport, and divert different WIP order items within a single trip or revolution around the sorter. In this manner, the mechanical capacity of the sorter is optimized by increasing the use per revolution of each sorter tray. In other words, At the consolidator 104, the items that are diverted for a WIP order are held at the gate 114 at the upper chamber or middle of the chute 110 and the OMS monitors or checks 238 the completion status of the WIP order at the gate 114 with sub-method 200f (FIGS. 2, 3, and 9). If the WIP order has not been completed, the OMS waits until it is determined that the order is completed. Once it is determined at 238 that the order is completed, the OMS determines whether the lower chamber or holding platform 112 of the consolidator is available to receive the WIP order held at the gate 114. If no, the OMS requests 240 that the other order currently held at the holding platform 112 be packed by a packing operator adjacent the consolidator 104 or discharged to a downstream process to clear the holding platform to allow the WIP order at the gate 114 to be released to the holding platform 112. If the holding platform 112 is empty and available, the OMS opens the gate 114 to release 242 the WIP order to the holding platform 112. The OMS then requests 244 that the WIP order now at the holding platform 112 be packed or discharged to downstream process. Once the WIP order is packed, the OMS determines 246 that the consolidator 104 is available for another WIP order.

Sub-method 200g is provided for controlling the allocation of inbound or non-decanted inventory that is stored in full cases in the mini-load storage system 106c (FIGS. 3 and 10). The allocation of inventory at 200g may be performed in a manner that is similar or substantially identical to the disclosed in the above-mentioned U.S. Pat. No. 10,882,696 or commonly owned and assigned U.S. patent application Ser. No. 17/592,290, filed Feb. 3, 2022 by Dematic Corp. of Grand Rapids, MI, the disclosure of which is hereby incorporated herein by reference in its entirety. The OMS monitors the inventory in the mini load storage system 106c at 248. The OMS determines at 250 whether there is sufficient inventory in the aisle-based storage units 106a (i.e. the "DMS" storage units) to meet the item requirements for all WIP orders, and if there is sufficient inventory, the OMS allocates 254 inventory from the aisle-based storage units 106a. If there is not sufficient inventory in the aisle-based storage units 106a for the WIP orders, the OMS allocates a full case of inventory from a mini load storage system 106c at 252 to the corresponding induct 108. Any other required items for the WIP order that are sufficiently available in the aisle-based storage units 106a are allocated therefrom at 254.

Figure 11:
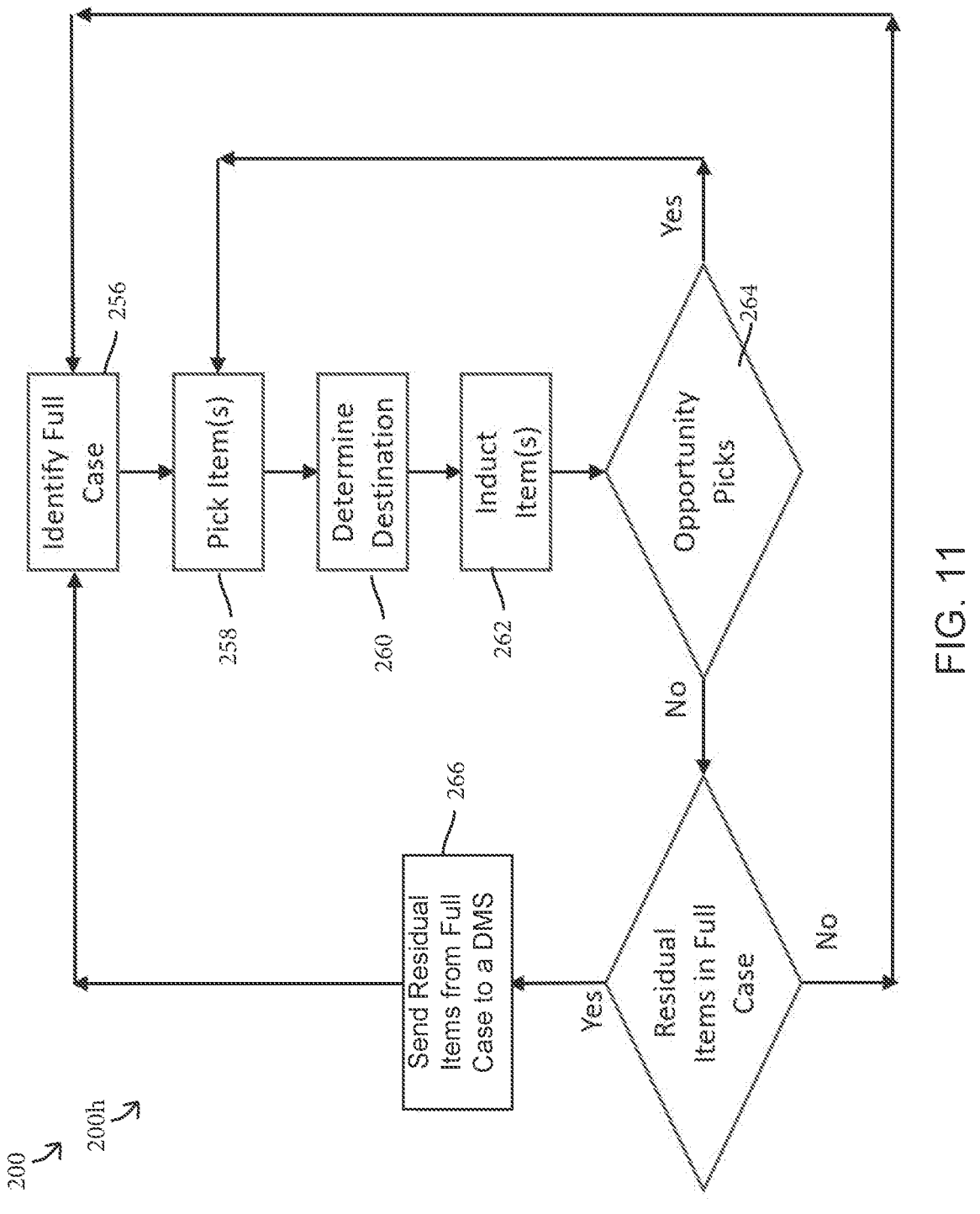
FIG. 11 is a diagram of a method for picking order items from a full case of inventory items and inducting the picked items to a sorter in an omnichannel sortation system, in accordance with the present invention.

Sub-method 200h is provided for controlling the induction or picking of items from the full cases from the mini load storage system 106c (FIGS. 3 and 11). The OMS controls the induct 108 of the mini load storage system 106c to identify 256 a full case present in the induct and directs the induct operator (e.g. human or robot) to pick 258 the required items for the WIP order from the full case. The OMS determines 260 a destination for the picked item(s), in which the destination for the picked item(s) is determined in a similar manner as the determination made at 226 of FIG. 7. Once the destination for the item(s) is determined at 260, the item(s) is inducted or transferred 262 to the sorter 102. After the WIP order items have been picked from the full case at 258 and inducted at 262, the sub-method 200h includes determining 264 whether any items remaining in the full case at the induct 108 are required for another WIP order or another order in the pending order list which is likely to be activated within a user-defined period (e.g. the next half hour, see FIG. 11). Thus, sub-method 200h may be said to be monitoring at the induct for opportunistic decant-ing/picking opportunities. The determination at 264 may be performed based on a sliding bubble approach, similar to that described in above-mentioned U.S. patent application Ser. No. 17/592,290. If it is determined at 264 that residual items in the full case may be opportunistically picked, the OMS returns to pick items from the full case at 258, determines 260 a destination for the opportunistically picked item(s), and then inducts them to the sorter 102 at 262. If no items are suited for opportunistic decanting/picking, the OMS determines whether there are any residual or remain-ing items in the full case, and if so, the residual items from the full case are transferred 266 to one of the aisle-based storage units 106a. The transfer at 266 includes inducting the residual items to the sorter 102, transferring the items via the sorter to an induct 108 of one of the aisle-based storage units 106a, and inducting the items into the corresponding storage unit 106a where the item(s) are stored until it required for a future WIP order.

Figure 12:
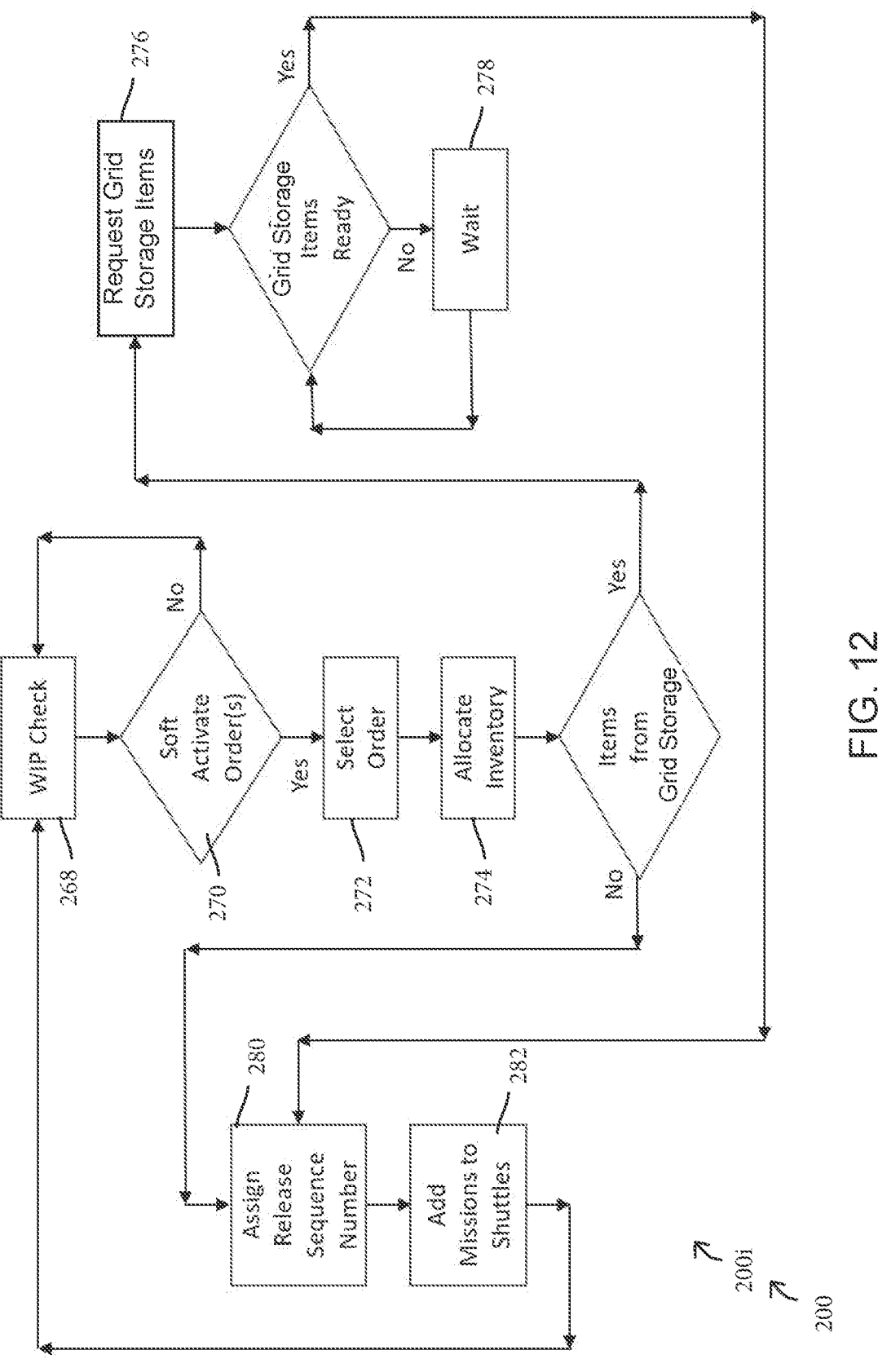
FIG. 12 is a diagram of another method for selecting a storage unit within an omnichannel sortation system from which to retrieve items for an in-process order, in accordance with the present invention.

Sub-method 200i, as depicted in the illustrative embodi-ment of FIG. 12, is provided for allocating inventory from grid-based storage units 106b (FIG. 3). The OMS monitors 266 the WIP orders to determine if any inventory stored in lower layers or grid regions of the grid storage array, and if necessary, controls the grid storage unit 106b to transfer 270 the required inventory from the lower layers to an upper layer or grid region for fulfilling a WIP order or another forthcoming order. In other words, forthcoming orders may be "soft activated" 270 by the OMS, without fully activating the order, in order to make sure that the inventory is more easily accessible at the upper layers of the grid storage unit 106b when the order is activated. Sub-method 200i may soft activate 270 all order items that are required but not present at the upper grid region prior to determining that that a particular order is ready for activation. Once all items are present in the upper grid region, the OMS selects and activates 272 the order and then allocates 274 the inventory for the WIP order. The allocation 274 of inventory may include items from the aisle-based storage units 106a, the grid storage unit 106b, and/or the mini load storage units 106c. The OMS determines whether any of the required items for a WIP order are present in the grid storage unit 106b, and if so, the OMS requests 276 those items. If the items are ready for retrieval (e.g. if a shuttle or robot are available to retrieve the item), the ready items are assigned 280 a release sequence number, such as in a similar manner to that performed at 208 of FIG. 4 for assigning release sequence numbers for the aisle-based storage unit 106a inventory. If the items are not ready in the grid storage unit 106b, the OMS waits 278 until all items are ready for the WIP order. If no items for a WIP order are required from the grid storage unit 106b, the OMS assigns 280 release sequence numbers to the items for the WIP order similar to that performed at 208 of FIG. 4. Once the release sequence numbers have been assigned to all items for a WIP order, the OMS adds or directs 282 retrieval mission instructions to operators (e.g. shuttles or autonomous mobile robots for aisles or grids) operating in the respective storage units 106 to retrieve the required order items based on their assigned release sequence numbers.

The following provides an exemplary embodiment of at least some of the aspects of method 200 and its various sub-methods, such as in the manner described in detail above and illustrated in FIGS. 4-12. In the exemplary embodiment, the method 200 includes the OMS monitoring the pending order list 202, selecting an order 204 to activate, the exemplary activated order including a first order item and a second order item, which are stored in different ones of the aisle-based storage units 106a. The OMS assigns release sequence numbers 208 to the first and second items and adds missions 210 to the corresponding storage unit shuttles based on the sequence numbers. When the first and second items are sequenced for retrieval, the OMS directs the release of the items. The shuttle corresponding to the first item retrieves and transports 214 the first item to the corresponding lift in a tote and the lift lifts the tote at 220 and transfers the tote with the first item to the corresponding induct 108. The shuttle corresponding to the second item retrieves and transports 214 the second item to the corre-sponding lift in a tote and the lift lifts the tote at 220 and transfers the tote with the second item to the corresponding induct 108. While the exemplary processes and steps dis-cussed herein are directed to a first and second item, it will be appreciated that the operations performed on one item may be performed in steps that are simultaneous, overlap-ping, interleaved, independent, and/or asynchronous with the operations performed on the other order item.

The OMS directs the operator at the first induct to pick 224 the first item from the tote and induct 228 the first item to the sorter 102 and directs the operator at the second induct to pick 224 the second item from the tote and induct 228 the second item to the sorter 102. The OMS assigns or selects 234 the best available consolidator 104 and chute 110 to receive the order items for the exemplary WIP order. The OMS directs the sorter 102 to divert 236 the first item and second item to the selected consolidator 104 at the earliest possible opportunity, respectively. Preferably, the sorter 102 diverts 236 each item within its respective first traversal of the sorter 102, or in other words without the order items having to make a second trip around the sorter 102, thus minimizing the amount of time the order items are present on the sorter. Once the first and second items are diverted 236 to the selected consolidator 104, the OMS discharges 240 or 244 the first and second items from the consolidator 104 to a downstream process, such as to a packing station, for example. In some embodiments, the consolidator 104 may be configured such that the order items are consolidated directly into a shipping container (e.g. carton, poly-bag, or the like) such that no additional packing is required and the completed order is ready to transport for delivery.

Once the first and/or second order items for the WIP order have been picked from the respective donor tote, the exem-plary embodiment of the method 200 may include opportu-nistically picking 230, 224 one or more additional items from the respective donor tote and transferring 228 the additional item(s) from the respective induct 108 to the sorter 102 for one or more of the other WIP orders. The exemplary embodiment of the system 100 may include aisle-based storage units 106a, grid-based storage units 106b, and mini load storage units 106c. Once the order items for a WIP order have been picked from a full case from a full vendor case from the mini load storage unit 106c, the method 200 may include opportunistically picking 264, 258 one or more additional items from the full vendor case at the induct 108 and transferring the additional items from the induct to the sorter for one or more other orders that are already activated or which will be activated within a user defined period. The method includes transferring 262 any residual items from the full case to the sorter 102 and then diverting 266 the residual items to an induct 108 of one of the aisle-based storage units 106a to be stored until those residual items are required for a WIP order.

Figure 13:
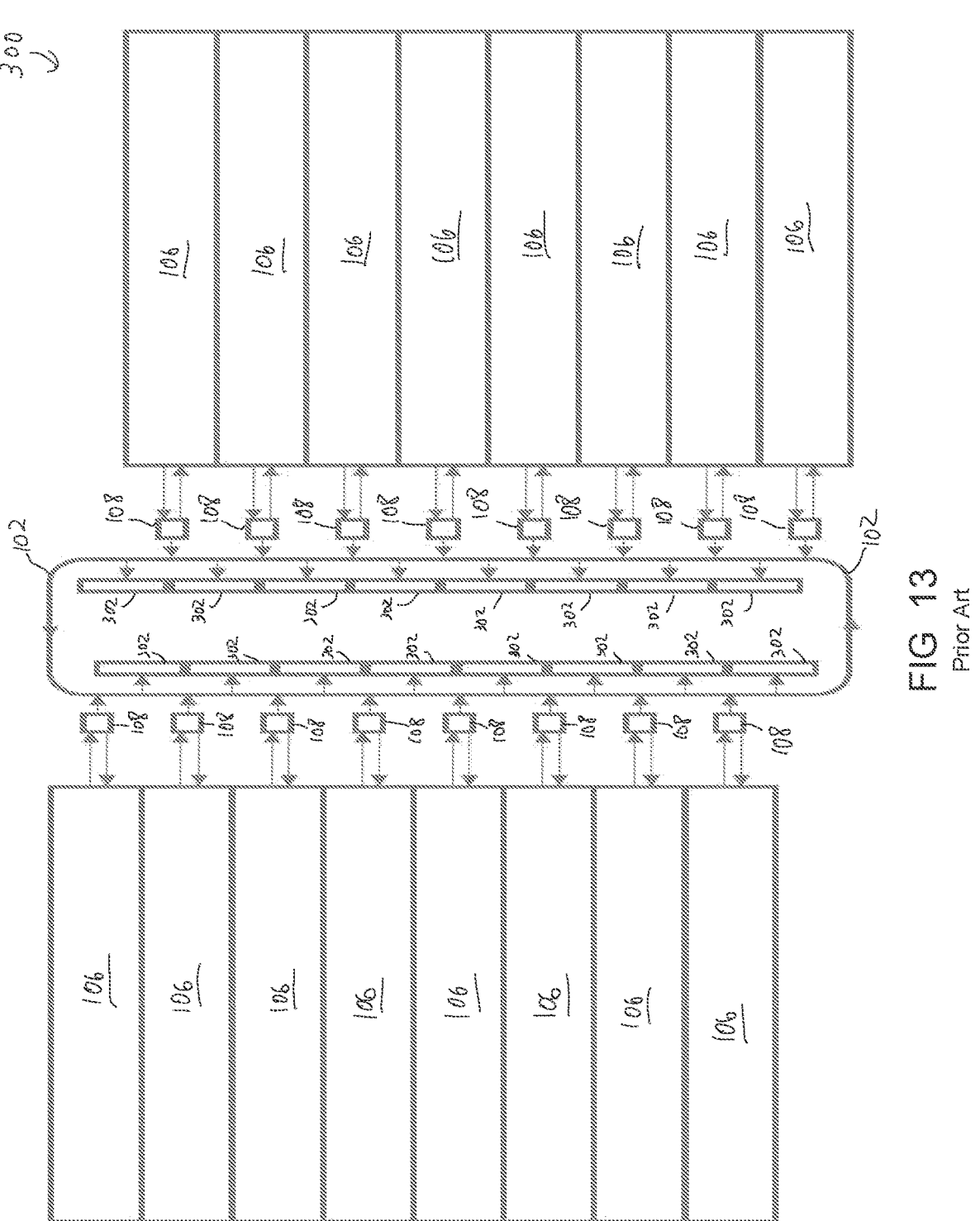
FIG. 13 is a schematic diagram of a circular sortation system in communication with an automated storage and retrieval system, as known in the prior art.

An example of a single channel sortation system 300 as known in the art is illustrated in FIG. 13. The system 300 includes an induct 108 for each storage unit 106 and picking workstations 302 on opposite sides of the sorter 102 from each induct 108. The picking workstations 302 are configured as put walls where multiple orders can be sorted by a human or robot operator to consolidate order items that are diverted from the sorter chutes of the sorter 102. The quantity of put walls 302 is equal to the quantity of storage units 106 as well as the quantity of inducts 108 of the system 300. As such, the system 300 may be limited to a quantity of WIP orders active at a given time that is equivalent to the quantity of put walls 302 and/or the number of order consolidation positions available at the put walls 302. For example, each put wall 302 may include two order consolidation positions for an operator to pick two orders too simultaneously. The system 300 may be limited to activating orders until the operator finishes the WIP order at one or both of the two order consolidation positions.

Thus, the systems 100 and 100a, and method 200 of the illustrative embodiments provide an omnichannel sortation system for an order fulfilment facility that is well suited for handling high volume throughput within a compact footprint of the facility. The system utilizes a continuous loop sorter with a multitude of consolidation platforms in divert communication with the sorter. There are a significantly higher number of consolidation platforms than induction workstations that feed the sorter, thereby permitting many orders to be inducted to the sorter without choking or overworking the order consolidators and/or downstream packing functions. The method may utilize a sliding bubble order management approach to optimize inventory allocation within the systems. Various formats of automated storage and retrieval systems may be utilized with the systems, including aisle-based, grid-based, pouch-based, and full case, mini load storage systems, to name some of the possible storage unit options. The configuration of the systems requires minimal resources and/or manual labor while still enabling a high throughput volume within the facility.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An order fulfilment system comprising:
an order management system comprising a computer adapted for controlling said order fulfilment system;
an automated storage and retrieval system comprising a plurality of storage units each configured to store a plurality of items or inventory receptacles;
a continuous loop sorter disposed adjacent said automated storage and retrieval system;
an induct at each of said storage units and operable to transfer items to and from the corresponding one of said storage units to said sorter;
a plurality of order consolidators adjacent said sorter in spaced arrangement with one another, each of said consolidators configured to receive one or more items from said sorter, wherein the items received in each of said consolidators comprises a consolidated order;
said order management system operable to:
direct said automated storage and retrieval system to release required items for a particular order from corresponding ones of said storage units containing the required items;

direct said induct at each of the corresponding ones of said storage units to transfer corresponding required items to said sorter; and
direct said sorter to divert all of the items for the particular order to an available one of said consolidators that is at least one chosen from (i) a shortest possible combined travel distance along the sorter for first and second items and (ii) immediately downstream of said induct corresponding to the last one of said storage units to release a required item for the particular order.

2. The order fulfilment system of claim 1, wherein said consolidated order comprises one chosen from an individual order, a batch order of similar items, and a plurality of individual orders to be directed to a single location.

3. The order fulfilment system of claim 1, wherein said sorter is configured to divert items to at least some of said inducts.

4. The order fulfilment system of claim 1, wherein said plurality of storage units comprises at least one chosen from an aisle-based storage system, a grid-based storage system, a pouch storage system, and a mini load storage system.

5. An order fulfilment method for an order fulfilment facility having an order management system, an automated storage and retrieval system including a plurality of storage units, a continuous loop sorter, an induct in communication with each of the plurality of storage units and operable to transfer items to and from the automated storage and retrieval system, and a plurality of order consolidators positioned along the sorter and configured to receive order items for a particular order from the sorter, said method comprising:
releasing and transporting a first item for a particular order from a first one of the storage units to its corresponding induct;
transferring the first item from its induct to the sorter;
releasing and transporting a second item for the particular order from a second one of the storage units to its corresponding induct;
transferring the second item from its induct to the sorter;
assigning, with the order management system, a selected consolidator from the plurality of consolidators to receive the order items for the particular order, wherein said assigning the selected consolidator comprises selecting a best available of the plurality of consolidators based on at least one chosen from (i) the consolidator requiring shortest possible combined travel distance along the sorter for the first and second items and (ii) the consolidator that is immediately downstream of the induct that will release its order item last;
transporting and diverting the first item with the sorter to the selected consolidator;
transporting and diverting the second item with the sorter to the selected consolidator; and
once the first and second items are present at the selected consolidator, discharging the first and second items from the consolidator to a downstream process.

6. The method of claim 5, wherein the plurality of storage units of the automated storage and retrieval system comprise at least one chosen from an aisle-based storage system, a grid-based storage system, a pouch storage system, and a mini load storage system.

7. The method of claim 5, wherein each of the plurality of consolidators comprises a chute and wherein two or more chutes are provided adjacent the sorter between each of the inducts of the plurality of storage units such that an item released from a particular induct may be diverted into any of the two or more chutes which are immediately downstream of the particular induct and upstream of the next induct.

8. The method of claim 5, further comprising directing an operator to retrieve the first item from the first storage unit and directing an operator to retrieve the second item from the second storage unit, wherein the operator comprises at least one chosen from a shuttle, a human, and an autonomous mobile robot.

9. The method of claim 5, further comprising assigning an order fulfilment sequence to pending orders and selecting a first order in the order fulfilment sequence to be executed, wherein the first order comprises at least the first item and the second item.

10. The method of claim 9, further comprising assigning a release sequence to each required item for the first order based on the location of each required item within the respective storage units.

11. The method of claim 8, wherein at least one chosen from said releasing and transporting the first item and said releasing and transporting the second item comprises lifting the item with a lift at the respective storage units and transporting the item from the lift to the respective induct.

12. The method of claim 5, further comprising an operator at the induct of the first storage unit picking the first item from a donor receptacle and transferring the first item to the sorter and an operator at the induct of the second storage unit picking the second item from a donor receptacle and transferring the second item to the sorter.

13. The method of claim 5, wherein the best available of the plurality of consolidators is determined with the order management system based on one or more chosen from (i) a currently unassigned consolidator, (ii) a consolidator that is configured to receive the type of goods defining the first item, second item, and any additional required items for the order, (iii) a consolidator that is positioned nearest the induct that will release its order item last, and (iv) a consolidator that is sufficiently downstream of the induct that will release its order item last such that the released item is able to reach the selected consolidator without traversing the entirety of the continuous loop sorter prior to being diverted to the selected consolidator.

14. The method of claim 5, wherein at least one of the first item and second item are stored in a mini load storage system and wherein at least one chosen from said releasing and transporting the first item and said releasing and transporting the second item comprises releasing the item in a full case of items from the mini load storage system and transporting the full case to the induct of the mini load storage system and transferring the item from the mini load storage system induct to the sorter.

15. The method of claim 14, further comprising opportunistically picking one or more additional items from the full case, and transferring the one or more additional items from the mini load storage system induct to the sorter for one or more other orders being fulfilled within the order fulfilment facility.

16. The method of claim 15, further comprising transferring any residual items from the full case from the mini load storage system induct to the sorter.

17. The method of claim 16, further comprising transporting and diverting the residual items from the sorter to an induct of one of the plurality of storage units, transferring the residual items from the induct to the storage unit, and storing the residual items in the storage unit.

18. The method of claim 5, wherein at least one chosen from said releasing and transporting the first item and said releasing and transporting the second item comprises transporting the particular item in a receptacle containing a plurality of items, and after transferring the particular item from the respective induct to the sorter, said method further comprising opportunistically picking one or more additional items from the receptacle and transferring the one or more additional items from the respective induct to the sorter for one or more other orders being fulfilled within the order fulfilment facility.

* * * * *